UNITED STATES PATENT OFFICE 2,475,228

DINITRO MONOAZO COMPOUND

Friedrich Felix, Basel, and Ernst Reich, Neue-Welt, near Basel, Switzerland, assignors to Ciba Limited, Basel, Switzerland, a Swiss firm No Drawing. Application July 27, 1943, Serial No. 496,338. In Switzerland August 10, 1942

1 Claim. (Cl. 260—205)

It has been found that valuable azo-dyestuffs are obtained by coupling diazotized 1-amino-3:5-dinitrobenzene compounds with amines of the benzene series which are capable of being coupled. The capability of coupling of these amines is determined by the presence of an amino group which may be primary, secondary or tertiary.

Among the 1-amino-3:5-dinitrobenzene compounds there may be named the following: 1-amino-3:5-dinitrobenzene itself, 1-amino-4-methyl-3:5-dinitrobenzene, 1-amino-2-methyl-3:5-dinitrobenzene, 1-amino-4-methoxy-3:5-dinitrobenzene, 1-amino-4-ethoxy-3:5-dinitrobenzene, and the like.

Particularly valuable are the dyestuffs obtained with amines free from nuclear, sulfo or carboxylic groups. If these amines are actually free from solubilizing groups, such as sulfonic groups and carboxylic groups, there are obtained water-insoluble dyestuffs which are soluble in organic liquids such as acetic acid ethyl ester and which may be used for dyeing esters and ethers of cellulose, for example textiles consisting of acetyl cellulose, further for dyeing textiles composed of superpolyamides or urethanes, and for dyeing artificial masses, lacquers, varnishes and other articles made from such products. Further, when coupling these diazotized 1-amino-3:5-dinitrobenzene compounds with amines in which the amino group is substituted by radicals which contain a solubilizing group, for example a sulfonic acid group, there are obtained soluble dyestuffs which are suitable for dyeing and printing the above mentioned textile fabrics, further in some cases also for dyeing and printing animal fibres.

Among the amines coming into consideration as coupling components there may be mentioned: aminobenzene, 2-methylaminobenzene, 3-methylaminobenzene, 2-methoxyaminobenzene, 3-methoxyaminobenzene, 3-acetylaminoaminobenzene, 3-methyl-6-methoxyaminobenzene, further also such aminobenzenes which contain as substituents in the amino group at least one alkyl radical or a hydroxy-alkyl radical or an esterified or etherified hydroxyalkyl radical, viz. for example mono- and dialkylaminobenzenes, such as N-methylamino-3-methylbenzene, N-hydroxyethylaminobenzene, N-dimethylaminobenzene, N-diethylaminobenzene, N-methylethylaminobenzene, N-methoxyethylaminobenzene, N-ethoxyethylaminobenzene, N-dihydroxyethylaminobenzene, N - hydroxyethyl - 3 - methylaminobenzene, N-dihydroxyethyl-3-methylaminobenzene, N-ethylhydroxyethyl-3-methylaminobenzene, N-dihydroxyethyl - 3 - methyl - 6 - methoxyaminobenzene. The dyestuffs obtained from such coupling components which, if desired, may be used advantageously in the form of their so-called ω-methanesulfonic acids, or obtained from analogous compounds, correspond for example to the formulas:

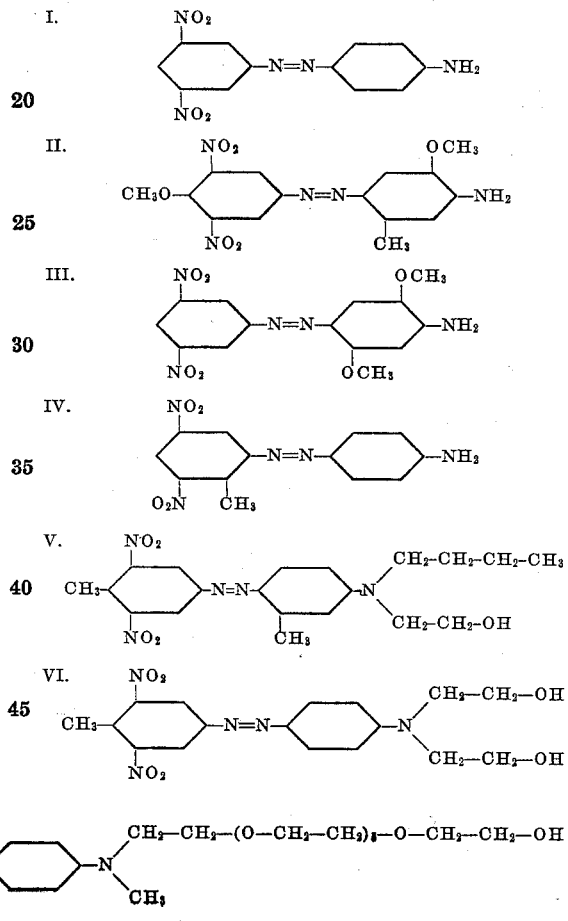

VIII. 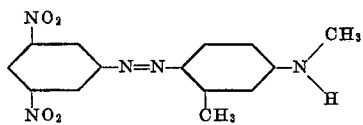

IX. 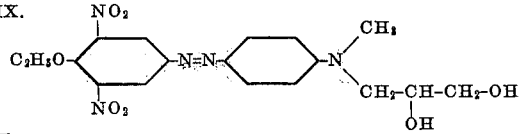

X. 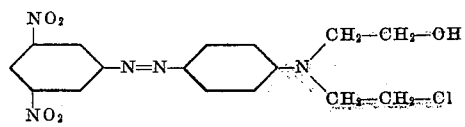

XI. 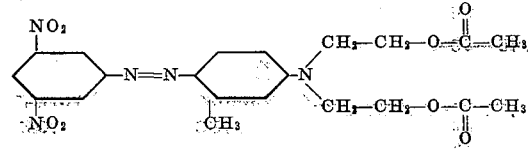

XII. 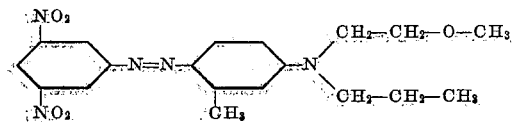

Dyestuffs which may also be used for dyeing the above named artificial fibres can further be obtained when using as coupling components the esters of polybasic acids of such N-alkylaminobenzenes which contain an OH-group in the alkyl radical, that is to say for example the sulfuric acid ester of N-methylhydroxyethyl-3-methylaminobenzene. Esters of organic dicarboxylic acids and sulfocarboxylic acids may also be used, viz. compounds described in U. S. patent applications Serial No. 239,404, filed July 8, 1938, (now U. S. Patent No. 2,354,187, granted July 25, 1944) and No. 443,624, filed May 19, 1942 (now U. S. Patent No. 2,361,618, granted October 13, 1944) and in U. S. Patent No. 2,283,327. Thus there are obtained dyestuffs for example of the formulas:

XIII. 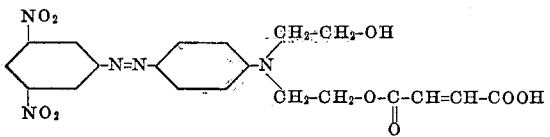

XIV. 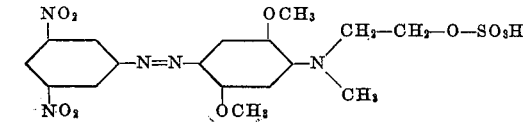

XV. 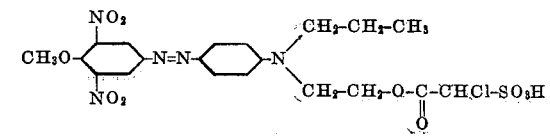

XVI. 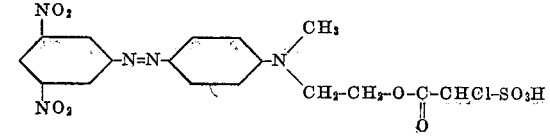

XVII. 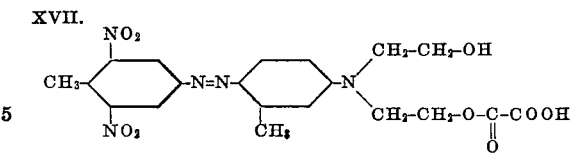

XVIII. 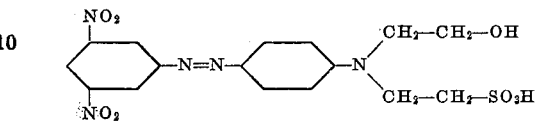

XIX. 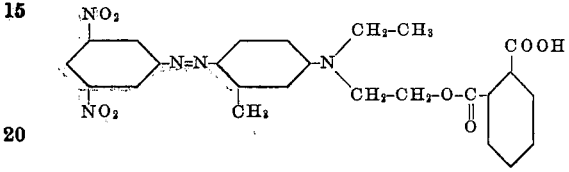

XX. 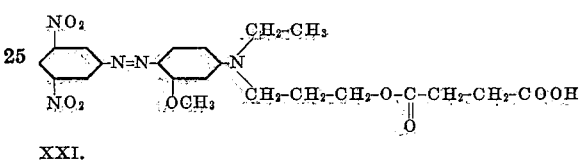

XXI. 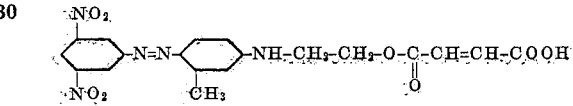

XXII. 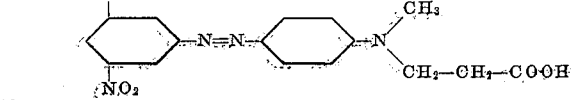

XXIII. 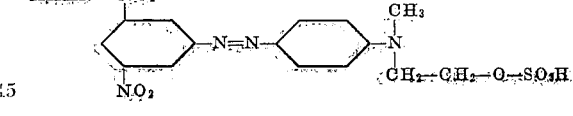

etc., which can of course also be obtained in such a manner that the dyestuffs of the foregoing paragraph are treated, as described in the indicated patents, with esterifying agents, such as oxalic acid, maleic acid, maleic acid anhydride, succinic acid anhydride, sulfuric acid, sulfochloroacetic acid, and the like. It is not necessary at all that the atom grouping imparting solubility be bound to the alkyl radical in the form of an ester; such alkyl radicals come also into consideration which are linked directly at the sulfo or carboxyl groups, as can be seen in the foregoing formulae.

The new products represent therefore new azo-dyestuffs of the general formula:

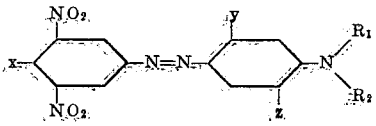

wherein $x$, $y$ and $z$ each stands for a member of the group consisting of hydrogen, methyl, methoxy and ethoxy, $R_1$ stands for a member of the group consisting of hydrogen atoms and alkyl and substituted alkyl radicals, and $R_2$ stands for a member of the group consisting of hydrogen atoms and alkyl and substituted alkyl radicals.

The following examples illustrate the invention, but are not to be regarded as limiting it in any way, the parts being by weight:

Example 1

18.3 parts of 3:5-dinitroaminobenzene are dissolved in 150 parts of hydrochloric acid of 30 per cent strength by heating. The solution is cooled by addition of ice and the cold suspension is mixed, while stirring, with a solution of 7 parts of sodium nitrite in about 25 parts of water.

A solution of 20.9 parts of the sodium salt of aniline-ω-methanesulfonic acid in 200 parts of water is prepared and about 200 parts of sodium acetate are added thereto. This suspension is mixed with the diazo solution and stirring is continued until the formation of dyestuff is complete. The dyestuff is filtered and washed until neutral. It is then stirred in about 500 parts of water and heated with 25 parts of sodium hydroxide solution of 30 per cent strength to 50–60° C. until it is clearly soluble in acetic acid ethyl ester. The ω-methanesulfonic acid radical is then split off. The dyestuff which corresponds to the foregoing Formula I is now filtered and washed until neutral. When dry it is an orange red powder dissolving in organic solvents to a yellow solution and dyeing acetate rayon from a fine suspension fast yellow tints.

The procedure is similar with the diazo solution of 1-amino-4-methyl-3:5-dinitrobenzene and a similar dyestuff is obtained with aniline when working in similar manner. When using 1-amino-3:5-dinitro-4-methoxybenzene, a dyestuff is obtained which dyes similar tints.

Instead of aniline also 3-methylaminobenzene can be used, in which case this base can be used directly.

Dyestuffs can also be obtained when using for example N-ethyl-hydroxyethylaminobenzene or N-dihydroxyethylaminobenzene instead of the indicated bases. When coupling these diazo compounds with the oxalic acid ester or the maleic acid ester of N-methylhydroxyethylaminobenzene, there are formed dyestuffs which dye acetate rayon from aqueous solutions yellow to orange tints.

Example 2

18.3 parts of 3:5-dinitroaminobenzene are dissolved in 150 parts of hydrochloric acid of 30 per cent strength by heating. The solution is cooled by addition of ice and the cold suspension is mixed, while stirring, with a solution of 7 parts of sodium nitrite in about 25 parts of water.

A solution of 18.1 parts of dihydroxyethylaminobenzene in 50 parts of water and 50 parts of 2N hydrochloric acid is now prepared. This solution is mixed with the diazo solution and the formation of dyestuff is completed by the addition of about 200 parts of sodium acetate. The dyestuff is filtered and washed until neutral. It corresponds to the formula:

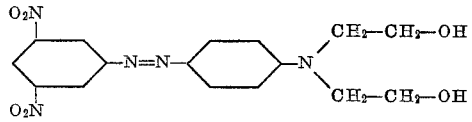

and dyes acetate rayon reddish orange tints.

Example 3

18.3 parts of 3:5-dinitroaminobenzene are dissolved in 150 parts of hydrochloric acid of 30 per cent strength by heating. The solution is cooled by addition of ice and the cold suspension is mixed, while stirring, with a solution of 7 parts of sodium nitrite in about 25 parts of water.

A solution of 30.75 parts of the chlorosulfoacetic acid - (phenyl-methyl-amino) - ethylester (obtained by heating 15.1 parts of methyl-hydroxyethyl-aminobenzene and 26.2 parts of chlorosulfoacetic acid in solvent naphtha to 110° C.) in 200 parts of water is now prepared. This solution is mixed with the diazo solution and the formation of dyestuff is completed by the addition of about 200 parts of sodium acetate. The dyestuff is made into a paste with about 200 parts of water, while stirring, and converted into the ammonium salt with the necessary quantity of ammonia, then filtered, washed and dried, if necessary after addition of sodium chloride. The dyestuff is a red powder dyeing acetate rayon reddish orange tints. It corresponds to the foregoing Formula XVI.

Example 4

18.3 parts of 3:5-dinitroaminobenzene are dissolved in 150 parts of hydrochloric acid of 30 per cent strength by heating. The solution is cooled by addition of ice and the cold suspension is mixed, while stirring, with a solution of 7 parts of sodium nitrite in about 25 parts of water.

A solution of 33.75 parts of the chlorosulfoacetic acid - (phenyl - hydroxyethyl - amino) - ethylester (obtained by heating 18.1 parts of di-hydroxyethylaminobenzene and 26.2 parts of chlorosulfoacetic acid in solvent naphtha to 110° C.) in 200 parts of water. This solution is mixed with the diazo solution and the formation of dyestuff is completed by the addition of about 200 parts of sodium acetate. The dyestuff is filtered and washed until neutral. It is made into a paste with about 200 parts of water, while stirring, and converted into the ammonium salt with the necessary quantity of ammonia, then filtered, washed and dried. if necessary after addition of sodium chloride. The dyestuff is a red powder dyeing acetate rayon reddish orange tints. It corresponds to the formula:

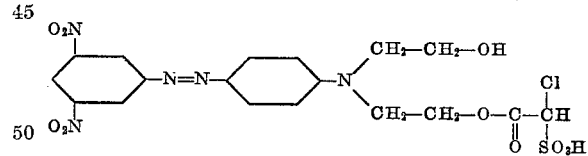

Example 5

10 parts of the first dyestuff of Example 1 are ground to a homogeneous paste containing 20 per cent of dyestuff by the addition of a suitable dispersing agent, such as Turkey red oil, sulfite cellulose waste liquor, sulfonation products of the residues of the benzaldehyde manufacture. One part of this paste is intimately mixed with 10 parts of water of 50° C. and so many parts of a concentrated soap solution that the dyebath prepared therefrom corresponds to a soap solution of 0.2 per cent strength. The whole is diluted with cold water to about 300 parts. 10 parts of acetate rayon yarn are introduced into the emulsion thus prepared and handled therein, the dyebath is heated to 75° C. within ¾ hour and dyeing is continued for about ¼ hour at this temperature. The yarn is then rinsed and brightened as usual. There are obtained fast vivid yellow shades which do not have a phototropic tendency. The appended claim is directed to the dyestuff used in the present example.

What we claim is:

The azo-dyestuff of the formula

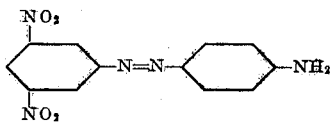

FRIEDRICH FELIX.
ERNST REICH.

REFERENCES CITED

The following references are of record in the file of this patent:

UNITED STATES PATENTS

| Number | Name | Date |
|---|---|---|
| 525,656 | Julius | Sept. 4, 1894 |
| 1,735,961 | Dreyfus | Nov. 19, 1929 |
| 1,935,657 | Mosby et al. | Nov. 21, 1933 |
| 2,092,075 | Knight | Sept. 7, 1937 |

FOREIGN PATENTS

| Number | Country | Date |
|---|---|---|
| 237,739 | Great Britain | Aug. 6, 1925 |
| 434,126 | Great Britain | Aug. 23, 1935 |
| 738,079 | France | Oct. 23, 1933 |

OTHER REFERENCES

Georgievics, Text Book of Dye Chemistry, page 94 (1920).

Georgievics and Grandmougin, Textbook of Dye Chemistry, published by Scott, Greenwood & Son, London (1920).

Meldola and Stephens—Transactions of the Chem. Soc., vol. 87, pages 1205-6.